United States Patent [19]

Halder et al.

[11] Patent Number: 4,741,589

[45] Date of Patent: May 3, 1988

[54] COUPLER FOR OPTICAL WAVEGUIDES

[75] Inventors: Ernst Halder, Renningen; Michael Ulmer, Stuttgart, both of Fed. Rep. of Germany

[73] Assignee: Alcatel N.V., Amsterdam, Netherlands

[21] Appl. No.: 661,504

[22] Filed: Oct. 16, 1984

[30] Foreign Application Priority Data

Oct. 21, 1983 [DE] Fed. Rep. of Germany ....... 3338315

[51] Int. Cl.$^4$ .............................................. G02B 6/36
[52] U.S. Cl. ............................ 350/96.20; 350/96.10
[58] Field of Search ........................... 350/96.20, 96.21

[56] References Cited

U.S. PATENT DOCUMENTS

| | | | |
|---|---|---|---|
| 4,385,797 | 5/1983 | Dubois et al. | 350/96.20 |
| 4,386,821 | 6/1983 | Simon et al. | 350/96.20 |
| 4,456,334 | 6/1984 | Henry et al. | 350/320 X |
| 4,548,466 | 10/1985 | Evans et al. | 350/96.20 |

FOREIGN PATENT DOCUMENTS

| | | |
|---|---|---|
| 2710949 | 9/1977 | Fed. Rep. of Germany . |
| 1573245 | 8/1980 | United Kingdom . |
| 2043943 | 10/1980 | United Kingdom . |
| 1587442 | 4/1981 | United Kingdom . |
| 2089065 | 6/1982 | United Kingdom . |

Primary Examiner—William L. Sikes
Assistant Examiner—Akm E. Ullah
Attorney, Agent, or Firm—Christie, Parker & Hale

[57] ABSTRACT

A coupler includes a transducer and an optical waveguide ending in front of the transducer, the fiber end of the optical waveguide is soldered into a guide sleeve by using a high-melting solder. To safeguard a sufficient adjusting clearance for the transverse displacements necessary for effecting the coupling, the guide sleeve in the wall of the housing of the encapsulated arrangement, passes through a borehole of larger diameter. This borehole is closed by a coverplate traversed as well by the guide sleeve, with this coverplate being connected to the guide sleeve and, simultaneously, to the housing by way of soldering and by the use of a low-melting solder. Due to the fact that the forces resulting during the cooling of the solder, act ring-symmetrically upon the guide sleeve, maladjusting transverse displacement vis-à-vis a previously adjusted position of the fiber end with respect to the transducer is prevented. Therefore, the soldering as carried out prior to the final assembly of the housing can be carried out by applying electrodes to the narrow sides of the housing frame in the current passage, and may be carried out subsequently to the adjustment and with the aid of an only short-lasting soldering process.

10 Claims, 1 Drawing Sheet

COUPLER FOR OPTICAL WAVEGUIDES

BACKGROUND OF THE INVENTION

The present invention relates to a coupler, for use in optical communication systems.

One type of optocoupler is described in DE-OS No. 33 07 466. This type of coupler includes an electrical-to-optical or optical-to-electrical transducer and an optical waveguide ending in front of the transducer, with a metallized fiber end being soldered in a gas-tight manner into a guide sleeve which, in turn, extends in a gas-tight manner through the wall of a hermetically sealed housing containing the transducer. In this type of coupler the guide sleeve together with the fiber end of the optical waveguide projecting therefrom, is mounted to the L-shaped leg of a bolt. The mounting is effected by way of soldering, by applying electrodes which are acted upon by current, to both sides of the L-shaped leg. The guide sleeve together with the fiber end as adjusted during the liquid phase of the solder by a micromanipulator to the transducer, however, must still be continuously readjusted also during the cooling of the solder until the latter changes into its phase of solidification, because the solder which shrinks during the cooling, sets free forces having a maladjusting effect.

SUMMARY OF THE INVENTION

It is the object of the invention to provide a simple and mechanically stable coupler which can be manufactured without requiring any preadjustment, as well as a method of coupling the optical waveguide to the transducer.

By embodying the coupler it is possible to achieve various advantages. The borehole in the wall of the housing, which has a larger diameter than the guide sleeve, makes sure that there is a sufficient clearance necessary for adjusting the guide sleeve, whereas the cover plate takes care that the forces resulting during the cooling of the soldered connection between th cover plate and the guide sleeve will act ring-symmetrically. In that way, the forces annul each other, and also in the case of a guide sleeve passing eccentrically through the borehole in the wall of the housing, do no longer cause any transverse displacement deviating from the adjusted position. The corresponding forces of the soldered connection between the cover plate and the housing are without influence because they, in the direction of the longitudinal axis of the guide sleeve, cannot effect any noteworthy maladjustment. Further advantages are referred to in the specification.

BRIEF DESCRIPTION OF THE DRAWING

In the following, the invention will now be described in greater detail with reference to an example of embodiment shown in FIGS. 1 and 2 of the accompanying drawings, in which.

DESCRIPTION OF THE PREFERRED EMBODIMENT

Figure 1:
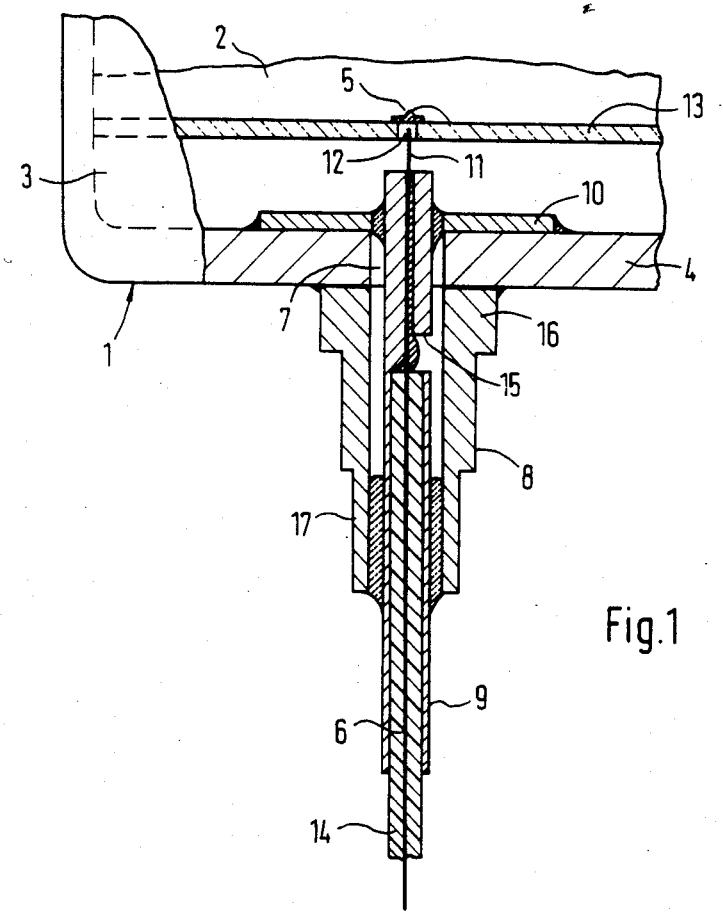
FIG. 1 shows a partly sectional view of a part of the coupler.

In the optical coupler as shown in FIG. 1, the housing 1 consists of a the baseplace 2 and of the cover 3 of a commercially available type of dual in-line housing, comprising a frame 4 additionally inserted between the baseplate 2 and the cover 3, with this frame 4 consisting of kovar. In that way there is obtainable a housing 1 of enlarged volume for taking up the electrical-to-optical or optical-to-electrical transducer 5, and for the amplifier circuit which, during the operation with a photodetector, is appropriately integrated as well, as well as for an optical waveguide 6 as coupled to the transducer 5, with this housing 1 being provided for this purpose with several dielectrically mounted (not shown) terminal pins in the baseplate 2.

In one leg of the frame 4 there is provided a borehole 7. In alignment with this borehole 7 is a protective sleeve 8 having the same internal diameter and consisting, for example, of brass which is mounted to the outside of the frame, for example, by way of brazing. Through the protective sleeve 8 and the borehole 7 in the leg of the frame, extends a guide sleeve 9 of smaller external diameter and consisting of a solderable metal which, at the same time, passes through a coverplate 10 as attached to the inside of the frame 4 of the housing 1. The coverplate 10 which is made e.g. of brass or steel, has an internal diameter which is only slightly enlarged compared to the external diameter of th guide sleeve 9. This coverplate 10 is connected to the guide sleeve 9 and the housing 1 or the frame 4 thereof, in a gas-tight manner by way of soldering. For this purpose there is used preferably a BiSn solder melting at the relatively low temperature of about 150° C.

The fiber end 11 of the optical waveguide 6 as protruding from the guide sleeve 9, is provided on its faceside with a fused lens. This fiber end 11 projects up into the borehole 12 of a carrier plate 13 made of ceramics which is disposed in parallel with the frame 4 containing the guide sleeve 9. This borehole 12 is topped by the transducer 5 which, in its design as a photodetector, completely covers the borehole 12.

The optical waveguide 6 as provided for the coupling to the transducer 5 is of the type having an outer plastics coating 14. For producing the bare fiber end 11, a partial length of this plastics sheathing 14 is stripped off the optical waveguide 6, and throughout the same partial length there is also removed the primary as well as the secondary coating of the optical waveguide 6. After this, the fiber end is metallized. With this metallized fiber end 11, the optical waveguide 6 is soldered with the aid of a PbSn solder which melts at a relatively high temperature of about 220° C., into the front part of the guide sleeve 9 which, compared to the fiber end 11, only has a slightly enlarged diameter, with the rearward longer portion of the guide sleeve 9 having a substantially larger internal diameter. In this portion of the guide sleeve 9, the outer plastics sheathing 14 is fixed with the aid of an adhesive. At the transistion between the two boreholes of different diameter, the guide sleeve 9 is provided with an indentation 15 extending transversely in relation to the longitudinal axis, so that in the course of manufacturing the fiber/sleeve arrangement, the transition between the optical waveguide 6 with its plastics sheathing 14 and the bare fiber end 11 can be checked with respect to a bubble-free imbedding in the dispensed adhesive, before the fiber end 11 is soldered into the front part of the sleeve, in the course of which the indentation 15 is extensively filled with solder.

The protective sleeve 8 as connected to the housing 1, is provided at its mounting end with a flange 16 of relatively small diameter, by which the protective sleeve 8, however, is given a good supporting surface for the soldering purpose. In distinction thereto, the free, rearward end of the protective sleeve 8 has a section 17 of reduced external diameter, on which a shrunk-on tubing (not shown) serving as a protective rubber sleeve may be mounted, surrounding the free end of the guide sleeve 9 as well as a partial length of the following plastics sheathing 14 of the optical waveguide 6. Since the guide sleeve 9 as clamped inside the housing 1 at the cover plate 10, represents the relatively long lever arm, it is appropriate to provide for a still further mechanical fixing. For this reason, the guide sleeve 9, within the end range of the protective sleeve 8, is provided with a soldered connection which, however, does not need to be gastight. Since the guide sleeve 9, inside the housing, is fixed in position with the aid of a low-melting solder, it is of advantage, for the purpose of avoiding any thermally unfavorable influence, to use also for the mechanical fixing as provided for in the end range of the protective sleeve 8, a low-melting BiSn solder.

In the course of manufacturing the coupler there is first of all made the frame 4 of the housing 1 with the bore-hole 7 permitting the passage of the guide sleeve 9, and the protective sleeve 8 is mounted to the frame 4. Thereafter, the separate carrierplate 13 which is provided with the borehole 12 and the transducer 5, is inserted in the frame 4 and is mechanically connected thereto by way of soldering. After that, the coverplate 10 is placed on the inside on to the frame 4, is aligned concentrically in relation to the borehole 7 thereof, and the guide sleeve 9 as manufactured in separate processing steps completely with the prepared optical waveguide 6, is introduced through the openings of the protective sleeve 8, the frame bore 7 and the coverplate 10, to such an extent into the interior of the frame that the lens as formed at the fiber end 11 will assume the desired position in the borehole 12 of the carrier plate in front of the transducer 5.

Figure 2:
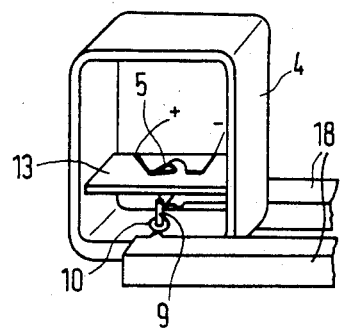
FIG. 2 shows the housing frame of the coupler according to FIG. 1 during the soldering in position of the guide sleeve, in a perspective representation.

The fine adjustment of the fiber end 11 is controlled by a micromanipulator which seizes the end of the guide sleeve 9 as rearwardly protruding from the protective sleeve 8, with the aid of a tong or plier, and performs the necessary displacement which is possible within the sufficiently large dimensioned opening. As soon as an optimum coupling is achieved, and as shown in FIG. 2, the electrodes 18 as applied from the outside to the two narrow sides of the frame leg, are made alive, and the cover plate 10, by adding solder, is connected in the current passage to the frame 4 and, simultaneously, to the guide sleeve 9 by way of soldering.

After that both the guide sleeve 9 and the rearward section 17 of the protective sleeve 8 are mechanically connected to one another likewise by way of soldering with a low-melting solder. The stepped diameter design of the protective sleeve 8 is of advantage in the course of this, because in this way a localization of heat is produced during the soldering thus permitting a quick and only short-lasting soldering in the course of which there is no longer caused a softening of the soldered joint at the front end of the guide sleeve 9. The thus manufactured frame 4 is then connected on one open side in a gastight manner by way of soldering or welding to the baseplate 2 which, if so required, is still completed by the amplifier circuit, and the electric connections from the carrierplate 13 to the terminal pins are established in the baseplate and, finally, this arrangement, by the inclusion of a protective gas, is hermetically sealed to the cover 3 placed thereon in a gas-tight manner.

We claim:

1. An optical coupler comprising:
   a housing having a wall with an opening therethrough, the opening having a predetermined diameter;
   an outer holding sleeve fixedly mounted to an outer surface of said wall such that the interior of the sleeve coincides with the opening in said wall, said outer sleeve having an internal diameter which is substantially the same as said predetermined diameter;
   an electrical-to-optical transducer positioned in the housing behind said opening;
   a guide sleeve extending through the opening in said housing and through said holding sleeve and having an outer diameter which is smaller than the predetermined diameter in order to form a space between said guide sleeve and the opening in said housing and between said guide sleeve and the interior of said holding sleeve to permit adjustment of said guide sleeve relative to said transducer;
   an optical waveguide extending through said guide sleeve and into said housing and having one end which is metalized and is positioned in front of and adjacent to said transducer, said optical waveguide being secured to said guide sleeve in a gas tight manner using a high melting point solder;
   a cover plate having an opening therein, the opening having a diameter which is greater than the guide sleeve outer diameter, said plate being positioned on the inner surface of said wall, said cover plate being secured to said guide sleeve and said housing such that the opening in said cover plate is substantially concentric with the outer diameter of said guide sleeve when said one end of said waveguide is optically aligned with said transducer;
   wherein said cover plate is soldered to said housing and to the front end of said guide sleeve in a gas-tight manner, and any forces resulting from the cooling of the solder joint at the front end of the guide sleeve act circularly symmetrically and cannot cause any transverse displacement of the guide sleeve and
   wherein said holding sleeve is soldered to the rear end of said guide sleeve using a low melting point solder, whereby said rear end of guide sleeve may be soldered to said holding sleeve after the front end of said guide sleeve has already been soldered to said cover plate and said cover plate has already been soldered to said frame, so that any non-circularly symmetric forces resulting from the cooling of the solder joint at the rear end of the guide sleeve have no misadjusting influence on the previously fixed front end of the guide sleeve.

2. The coupler of claim 1 further comprising a carrier plate positioned in said housing parallel to said wall and having a borehole therethrough, said transducer being positioned on the surface of said carrier plate which is directed away from said guide sleeve and covering said borehole.

3. The coupler of claim 1 wherein said housing further includes a base plate positioned on and perpendicular to said wall and a cover positioned parallel to said base plate.

4. The coupler of claim 1 wherein said outer sleeve includes an end portion directed away from said wall and having an outer diameter which is smaller than the outer diameter of the remaining portion of said outer sleeve, said guide sleeve being joined to said outer sleeve at said end portion.

5. The coupler of claim 1 further comprising a tubing which is shrunk on said end portion and the portion of said optical waveguide which is adjacent said end portion.

6. The coupler of claim 2 wherein said guide sleeve has a transversely extending indentation.

7. The coupler of claim 1 wherein said optical waveguide includes a primary coating, a secondary coating surrounding said primary coating and a plastic sheathing surrounding said secondary coating and wherein said primary coating, secondary coating and plastic sheathing are removed from said one end of said optical waveguide.

8. The coupler of claim 7 wherein said optical waveguide is joined to the interior of said guide sleeve by PbSn solder and wherein said guide sleeve, cover plate and said housing are joined together by BiSn solder.

9. A method of optically coupling an optical waveguide to a transducer comprising:
placing a guide sleeve into a housing of a coupler through a longitudinal passageway of a holding sleeve fixed to said wall, a first opening in the housing wall, and through a corresponding second opening in a cover plate loosely positioned on the side of the wall remote from said holding sleeve, each of said first opening, said second opening and said longitudinal passageway having a diameter which is greater than the outside diameter of the guide sleeve;
positioning an optical waveguide having a metalized end portion soldered to the guide sleeve adjacent the transducer which is positioned in the housing;
adjusting the guide sleeve relative to the first opening in order to precisely position the optical waveguide to achieve optimum coupling parameters;
simultaneously joining together the cover plate, the housing and the front end of the guide sleeve after the optical waveguide has thus been positioned; and
joining the rear end of the guide sleeve to the holding sleeve after the front end of the guide sleeve has thus been joined to the cover plate.

10. The method of claim 9 wherein said joining step includes:
applying solder to the cover plate, housing and guide sleeve;
arranging electrodes on opposite sides of the housing; and
activating the electrodes to melt the solder.

* * * * *